United States Patent [19]

Noble

[11] Patent Number: 4,671,625
[45] Date of Patent: Jun. 9, 1987

[54] OPTICAL APPARATUS FOR PRODUCING A NATURAL, VIEWABLE AND OPTICALLY INTERACTIVE IMAGE IN FREE SPACE

[76] Inventor: Lowell A. Noble, 18138 Bancroft Ave., Monte Sereno, Calif. 95030

[21] Appl. No.: 525,149

[22] Filed: Aug. 22, 1983

[51] Int. Cl.⁴ .............................................. G02B 3/08
[52] U.S. Cl. .................................... 350/452; 350/144
[58] Field of Search ............... 350/451, 452, 144, 167, 350/480

[56] References Cited

U.S. PATENT DOCUMENTS

| | | | |
|---|---|---|---|
| 3,632,184 | 1/1972 | King | 350/144 |
| 3,761,184 | 9/1973 | McLaughlin | 350/452 |
| 3,959,580 | 5/1976 | Chocol et al. | 178/6.5 |
| 4,208,086 | 6/1980 | Perry | 350/3.85 |
| 4,232,968 | 11/1980 | Kempf | 350/144 |
| 4,309,074 | 1/1982 | Granieri Jr. | 350/144 |
| 4,333,707 | 6/1982 | West | 350/144 |
| 4,398,810 | 8/1983 | Hodges et al. | 350/452 |
| 4,490,745 | 12/1984 | Erickson et al. | 350/144 |

Primary Examiner—John K. Corbin
Assistant Examiner—D. M. Dzierzunski
Attorney, Agent, or Firm—Thomas M. Freiburger

[57] ABSTRACT

Apparatus for producing a natural, viewable and optically interactive image of a luminous object which appears to float in free space at a location different from the location of the object. The apparatus includes a hollow opaque internally non-reflective shroud surrounding the luminous object and an optical system with an opening in the shroud for viewing the image of the object through the optical system. The optical system includes first and second convex lenses each having an f number between about 0.5 and about 1.5. Visible reference means defining a transparent plane between the viewer and the optical system are provided. Embodiments having optical systems including mirror means and fresnel lens are described as well as embodiments for simultaneous viewing of images of more than one object.

15 Claims, 5 Drawing Figures

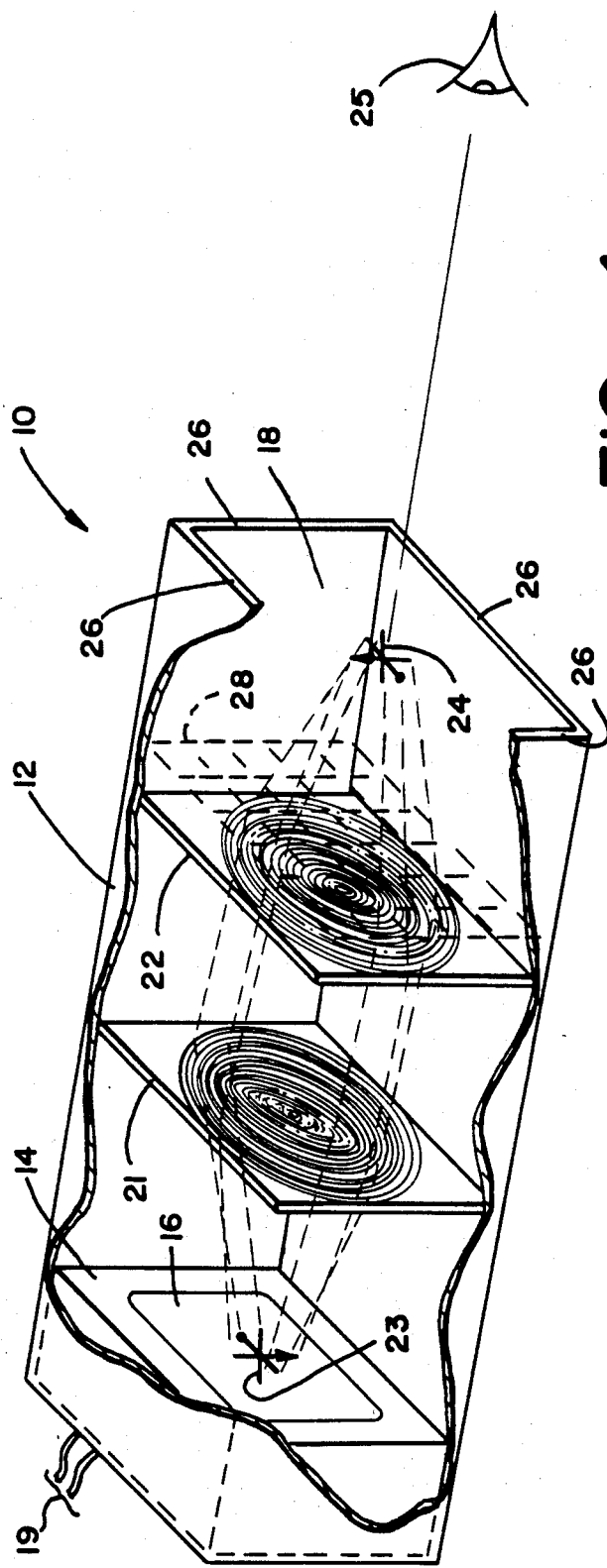
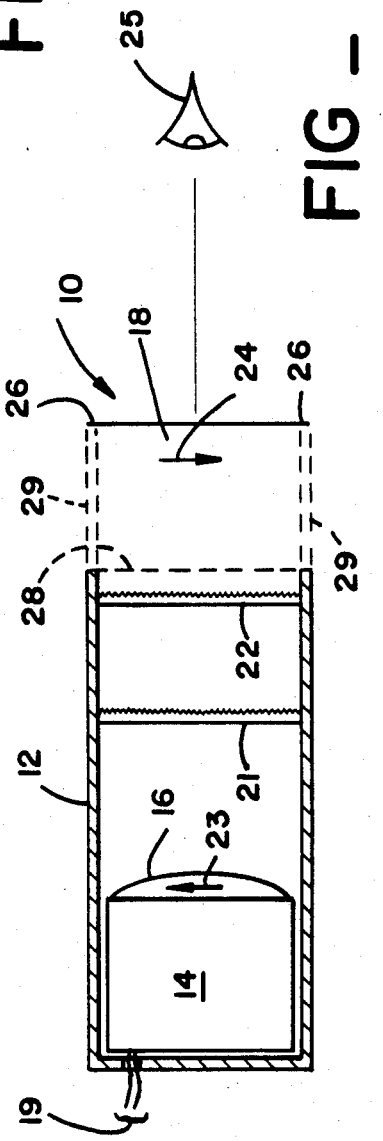
FIG-1
FIG-2

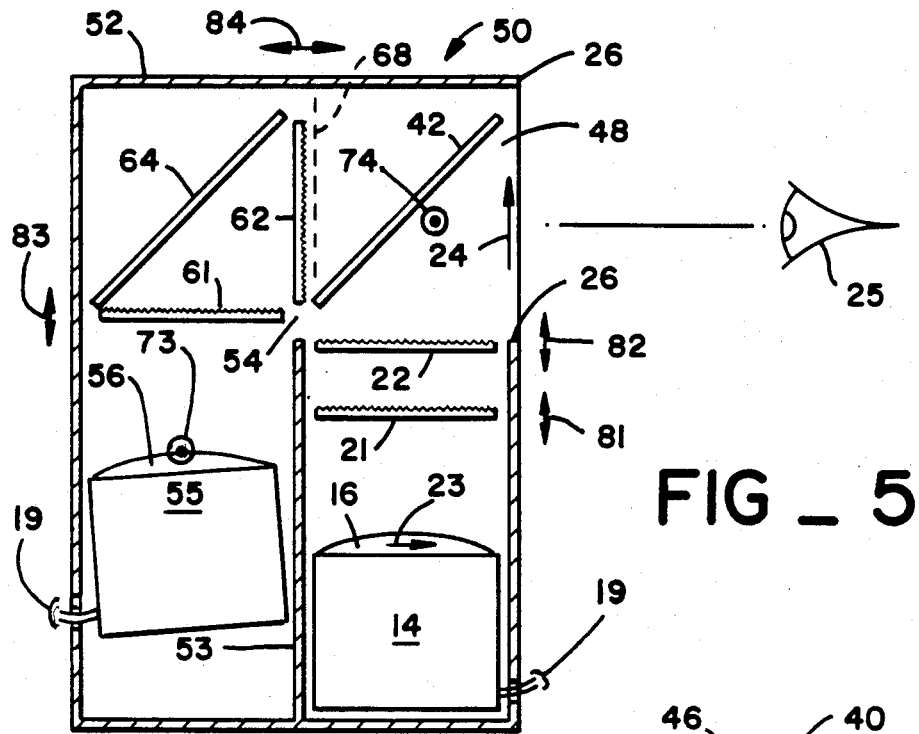
FIG_5
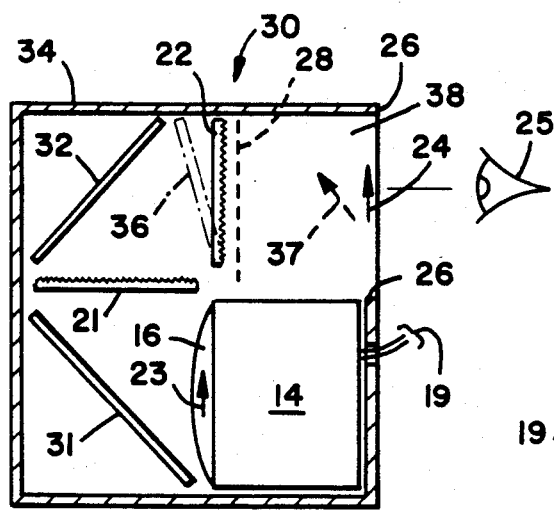
FIG_3
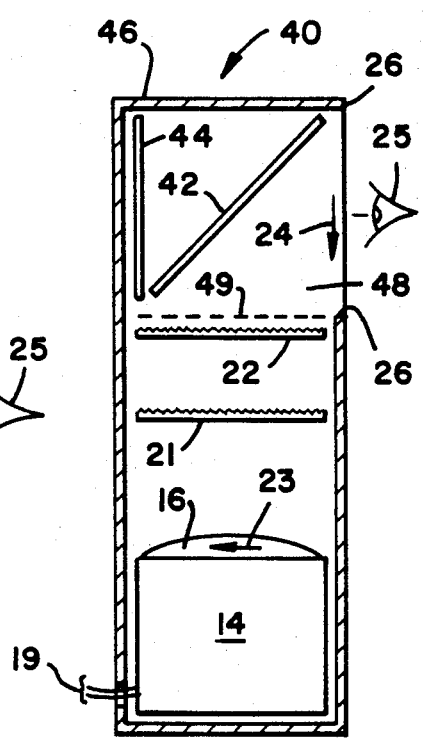
FIG_4

OPTICAL APPARATUS FOR PRODUCING A NATURAL, VIEWABLE AND OPTICALLY INTERACTIVE IMAGE IN FREE SPACE

FIELD OF THE INVENTION

This invention relates to apparatus for optically viewing an object such as a cathode ray tube display or the like and more particularly to an optical apparatus capable of producing a natural, viewable and optically interactive image of such an object that appears to float at a location in free space different from the location of the object.

BACKGROUND OF THE INVENTION

Optical systems for projecting images onto a surface are well known in the art. Such images, although viewable are not natural, in the sense that paintings and photographs are not natural, since they cannot optically interact with any other object and three dimensional information contained therein is presented to the viewer in fixed non-interactive form.

Telescopic, microscopic and stereoscopic optical systems are also well known in the art. Such systems produce magnified images of an object located at an indefinite and imaginary place that is completely unrelated to the surroundings of the viewer. Although the three dimensional information contained in such a magnified image itself may be optically interactive, the image is unnatural in that it cannot optically interact with any object outside the image itself.

It is known in the art to produce a natural, viewable and optically interactive image in free space of an object through the use of parabolic or spherical mirrors. However, the object must be precisely located with respect to the focal point of the mirror and thus the object and the image produced must be stationary with respect to the apparatus.

Finally, holographic apparatus for producing a natural, viewable and optically interactive image in free space is known in the art. However, such apparatus requires that a holographic transparency first be made of the object using precisely located laser devices and that the holographic transparency then be illuminated by precisely located laser devices to produce the image in free space. Such apparatus is expensive both in fabrication and use and does not provide direct viewing of an image of the object in real time.

According to this invention, simple and inexpensive apparatus is provided for producing an image of an object in real time that appears to float at a location in free space different from the location of the object, which image is natural, viewable and optically interactive with its surroundings and background and which will move with respect to the apparatus in response to movement of the object with respect to the apparatus.

SUMMARY OF THE INVENTION

Apparatus according to this invention comprises a first convex lens and a second convex lens, each having an f number between about 0.5 and about 1.5, arranged with respect to each other to provide a field of view therethrough including a luminous object. The first lens, second lens and luminous object are surrounded by a hollow shroud of opaque material having non-reflective internal surfaces and an opening therein. The first convex lens is located between the second convex lens and the object to be viewed. The second convex lens is located between the opening in the shroud and the first convex lens. A viewer looking into the opening in the shroud can see a natural, viewable, optically interactive image of the object which will appear to float in free space between the viewer and the second convex lens. Movement of the object with respect to the apparatus will result in a corresponding movement of the image with respect to the apparatus in real time.

BRIEF DESCRIPTION OF THE DRAWING

This invention will be more fully understood from a reading of the following detailed description of preferred embodiments thereof in conjunction with the appended drawing wherein:

FIG. 1 is a perspective view of a preferred embodiment of this invention having a rectilinear optical axis and with portions broken away to show internal elements thereof.

FIG. 2 is a reduced side view of FIG. 1 with the near side of the shroud removed to expose the internal elements thereof.

FIG. 3 is a side view in elevation similar to FIG. 2 but showing an embodiment of this invention having a folded optical axis.

FIG. 4 is a side view in elevation similar to FIG. 2 but showing an embodiment of this invention in which a background scene is added to the image produced.

FIG. 5 is a side view in elevation similar to FIG. 4 but showing an embodiment of this invention adapted to produce two separate images in optically interactive relation to each other.

DETAILED DESCRIPTION OF PREFERRED EMBODIMENTS

The embodiment 10 of this invention shown in FIG. 1 is preferred for illustrative purposes because of its simplicity. Such embodiment 10 comprises an elongated tubular (i.e., hollow and generally elongated) shroud 12 of rectangular cross-section closed at one end by a conventional cathode ray tube monitor 14. The shroud 12 is made of opaque material and is provided with non-reflective internal surfaces. The face plate 16 of the cathode ray tube monitor faces the open end 18 of the shroud 12 and appropriate signal and power input lines for the cathode ray tube monitor 14 are provided through the closed end of the shroud 12.

A first convex lens 21 is positioned at a given distance in front of the face plate 16 of the cathode ray tube monitor. A second convex lens 22 is positioned between the first convex lens 21 and the open end 18 of the shroud 12. The distance between the open end 18 of the shroud 12 and the second convex lens 22 is preferably about the same or slightly greater than the given distance between the first convex lens 21 and the face plate 16 of the cathode ray tube monitor.

In the preferred embodiment of this invention, the first convex lens 21 and the second convex lens 22 are substantially identical to each other in optical characteristics and oriented in the same optical sense with respect to the object and the image. The first convex lens 21 and the second convex lens 22 each preferably have an f number of 1. In other words, the focal length of each lens is preferably equal to the effective diameter thereof. Thus, in the embodiment 10 of this invention shown in FIG. 1, each of the first convex lens 21 and second convex lens 22 is a rectangular convex Fresnel lens having diagonal dimensions equal to the internal diagonal dimensions of the shroud 12 and mounted in the shroud 12 normally to its axis with the planar surface of each lens facing the face plate 16 of the cathode ray tube monitor 14. In the preferred embodiment, the first convex fresnel lens 21 is designed with the object distance thereof equal to its focal length and the second convex fresnel lens is designed with the image distance thereof equal to its focal length. The center of the first lens 21 and the center of the second lens 22 both preferably lie on the axis of the shroud 12, thus establishing an optical axis which coincides with the axis of the shroud 12.

In the embodiment 10 of this invention, as shown in FIG. 1, appropriate power and an appropriate signal are applied to the cathode ray tube monitor 14 through the lines 19 to produce an object 23 on the face plate 16 of the cathode ray tube monitor 14. Such object 23 is inherently luminous and may contain three-dimensional information although it is physically planar. A viewer, represented by the eye 25, looking into the open end 18 of the shroud 12 can see an image 24 of the object 23 floating in free space between the viewer and the second convex lens 22. Since the focal length of the first convex lens 21 and the focal length of the second convex lens 22 are substantially equal to each other, the spacing between the second convex lens 22 and the image 24 will be substantially equal to the spacing between the first convex lens 21 and the object 23. The image 24 is technically a real image but not "real" in the sense that an image projected onto a surface is "real". The image 24 is in space in the mind of the viewer 25 in the same sense that a source of sound in free space is produced in the mind of a listener to a stereophonic sound system. The image 24, in the mind of the viewer may oscillate in location from free space as shown in FIG. 1 to a location on the facing surface of the second lens 22, without the prompting aids provided by this invention. This is because the mind is accustomed to seeing illuminated images on a surface and wants to see them on a surface. It will therefor etend to place such illuminated images on a surface beyond, without a reference which immediately indicated the depth of the image. The tendency of the mind to place the image against a surface (e.g., the surface of the lens 22) is an optical illusion.

Thus, the edges of the shroud 12 surrounding the open end 18 thereof provide a first visible reference means 26 defining a first transparent plane which will tend to stabilize the location of the image 24 in free space to the eye of most viewers. The addition of second visible reference means defining a second transparent plane on or closely spaced from the surface of the second lens 22 facing the viewer 25 will further contribute to the three-dimensional appearance of the image 24 by further stabilizing the location of the image 24 in space. Thus, the second visible reference means is preferably a grid-like device providing a reticle-type presentation to the eye of the viewer 25 but which will be seen by the viewer 25 behind the image 24. For example, a side illuminated clear transparent sheet having fine lines formed in one surface thereof to provide diffusion of the side illumination may be used to provide the second visible reference means 28 to define the second transparent plane.

Referring to FIG. 2, it will be understood that, since the object 23 is a planar figure, the image 24 will also be a planar figure at a plane located in space between the transparent plane defined by the first visible reference means 26 and the transparent plane defined by the second visible reference means 28. However, any three-dimensional information, contained in the image 24 will be enhanced by parallax effects presented to the eye of the viewer 25 by the first visible reference means 26 and the second visible reference means 28 with respect to the image 24.

The opaque shroud 12 is required in order for the image 24 to be natural and viewable. If the portion of the shroud on the opposite side of the second lens 22 from the viewer is not opaque, or if excessive reflections occur therein, the image 24 will appear to oscillate between a location in free space and a location on the surface of the second lens 22 facing the viewer. However, it has been found that the portion of the shroud 12 between the first transparent plane established by the first visible reference means 26 and the second transparent plane defined by the second visible reference means 28 need not be opaque. In fact, that portion 29 of the shroud 12 may be omitted in embodiments of this invention where it is convenient to do so, although the image then may be somewhat more difficult for the viewer to see in space.

The embodiment 10 of this invention as illustrated in FIGS. 1 and 2, as well as the other embodiments disclosed herein, are particularly effective where a discreet luminous object 23 is produced on an otherwise blank face plate 16. The viewer 25 may place his hand within the shroud 12 between the first transparent plane defined by the first visible reference means 26 and the second transparent plane defined by the second visible reference means 28 alongside the image 24. The viewer will have the clear illusion of extending his hand beyond the image 24 so long as no portion of his hand is interposed between the object 23 and image 24. Thus, this invention enables optical interaction between the image 24 and a real object located alongside the image 24.

Where the object 23 is a scene or picture occupying the entire face plate 16 of the cathode ray tube 14, such picture or scene will appear to be located at a plane in free space between the first and second transparent planes defined by the visible reference means 26 and 28 respectively. Although such a scene cannot optically interact with a real object or another image, the three-dimensional information contained in such scene will be subtly enhanced in appearance to the viewer 25.

The most important application of this invention results from the fact that the image 24 of a discreet luminous object 23 can optically interact with a background scene or object as will be more fully described hereinafter.

Since the optical characteristics of the first lens 21 are substantially the same as the optical characteristics of the second lens 22, the spacing therebetween in the embodiment 10 as shown in FIGS. 1 and 2 is immaterial. In other words, regardless of the spacing between the first lens 21 and the second lens 22 the image 24 will always appear to the viewer 25 to be located in a plane spaced at a distance in front of the second lens 22 which is substantially equal to the distance by which the first lens 21 is spaced from the face plate 16 of the cathode ray tube monitor 14. Thus, in preferred embodiments of this invention there will be no magnification or reduction in size of the image 24 with respect to the object 23 in order to avoid complicated optics. Similarly, in the preferred embodiment of this invention, the lens 21 and the lens 22 each have an f number of about 1 where f=focal length/diameter. It has been found that such f number must be between 0.5 and 1.5 in all embodiments of applicant's invention. A lens having an f number less than 0.5 will be expensive and difficult to fabricate. Indeed, a lens other than a Fresnel lens having an f number less than 0.5 will tend to produce an internal image which would defeat the purposes of this invention. A lens having an f number greater than 1.5 will tend to produce a faint image. In other words, light from the object 23 will be lost in the optical system tending to reduce the apparent brightness of the image 24 to a level below that required by the eye of the human viewer for the purposes of this invention unless the object 23 is made excessively luminous.

However, it will be understood that the first lens 21 and the second lens 22 need not be oriented in the same sense with respect to each other in all embodiments of this invention. If the lens 21 is not oriented in the same sense as the lens 22, optical aberrations will not tend to be corrected as in the preferred embodiment of this invention. Similarly, the first lens 21 need not have the same power as the second lens 22 in all embodiments of this invention. If the first lens 21 and the second lens 22 do not have the same power, then the optical characteristics of the system will be more complicated and some variable magnification or reduction in the image 24 with respect to the object 23 is to be expected depending on the precision with which the device is constructed and movement of the lenses with respect to each other as discussed hereinafter.

Referring to FIG. 3, an embodiment 30 of this invention is shown which differs from the embodiment 10 of FIGS. 1 and 2 only in that a pair of mirrors 31 and 32 are used to provide a folded optical axis. Thus, the embodiment 30 includes a shroud 34 in the form of a hollow box having an opening 38 in one side thereof rather than the elongated tubular shroud 12 of FIG. 1. The embodiment 30 is otherwise identical to the embodiment 10 of FIGS. 1 and 2 and the reference numerals of FIGS. 1 and 2 are used in FIG. 3 to designate corresponding parts.

As shown in FIG. 3, the cathode ray tube monitor 14 is positioned in the shroud 34 beneath the opening 38 with the face plate 16 of the cathode ray tube monitor 14 facing away from the opening 38. The first mirror 31 is positioned in front of the face plate 16 of the cathode ray tube monitor 14 at a 45° angle to reflect an image of the object 23 produced on the face plate 16 of the cathode ray tube monitor 14 upwardly through the first convex lens 21 to the second mirror 32. The second mirror 32 is positioned at a right angle to the first mirror 31 to reflect the image of the object 23 through the second convex lens 22 toward the opening 38 of the shroud 34. The spacing and dimensions of the elements are selected so that a viewer 25 will see the image 24 of the object 23 apparently floating in free space in front of the second convex lens 22. The edges 26 of the opening 38 may be painted white or otherwise treated to provide enhanced visible reference means establishing a first transparent plane between the viewer 25 and the image 24. Second visible reference means 28 may be provided on or in close spaced relation to the surface of the second convex lens 22 facing the viewer 25 in order to enhance the viewability of the image 24.

It should be pointed out that the spacing between the viewer 25 and the apparatus of this invention as represented by either embodiment 10 or embodiment 30 will not affect the location or viewability of the image 24. There is, of course, a certain viewing cone within which the viewer 25 must be located in order to see the image 24. However, the apex angle of such viewing cone is quite large and, even if the viewer is so close to the image 24 as to lose peripheral perception of the first visible reference means 26, the image 24 will remain viewable due to the second visible reference means 28.

In the embodiment 10 of this invention, as shown in the drawing and described above, the first convex lens 21 and the second convex lens 22 are oriented in parallel planes in order to simplify the description of the basic operation of this invention. Similarly, in the embodiment 30 shown in FIG. 3, the first convex lens 21 and the second convex lens 22 are each shown as extending normally to the optical axis of the apparatus. However, as shown by the dashed lines 36 in FIG. 3, the second convex lens 22 may be tilted, resulting in a corresponding tilting of the image 24 as indicated by the dashed lines 37. It will be understood that the first convex lens 21 could also be tilted to produce a corresponding tilting of the image 24. If both the first convex lens 21 and the second convex lens 22 are tilted, the tilting of the image 24 would be a composite of the tilts of the first convex lens 21 and the second convex lens 22. This feature of the invention is important because it can be used to enhance three-dimensional information presented by the object 23 and image 24. In other words, referring to FIG. 3, if the object 23 is an arrow produced in perspective to appear to point upwardly and away from the viewer, then the tilt of the second convex lens 22 as indicated by the dashed lines 36 would enhance such perspective information so that the three-dimensional illusion of the image 24 would be enhanced to the eye of the viewer 25. The image still is planar, but in a plane not parallel to the reference plane 26. Thus, it is in a sense three-dimensional, with respect to depth from the viewer's eye 25.

Referring to FIG. 4, a further embodiment 40 of this invention is shown which is identical to the embodiment of FIGS. 1 and 2, except that it includes a partial mirror 42 through which a background scene 44 may be viewed behind the image 24. Thus the reference numerals of FIGS. 1 and 2 have been used to designate corresponding parts. It will be seen that the elongated tubular shroud 46 of the embodiment 40 is closed at both ends and is provided with a side opening 48 at the end thereof remote from the cathode ray tube monitor 14. The partial mirror 42 is mounted opposite the opening 48 at a 45° angle with respect to the second convex lens 22. The background scene 44 is mounted on the opposite side of the partial mirror 42 from the opening 48. The edges 26 of the opening 48 provide the visible reference means defining the first transparent plane and a viewer 25 looking through the opening 48 will see an image 24 of the object 23 produced on the face plate 16 of the cathode ray tube monitor 14 floating in free space within the opening 48. The viewer 25 will also see the background scene 44 behind the image 24. In this embodiment of the invention, the background scene 44 is effectively located on or at the surface of the second convex lens 22 as indicated by the dash lines 49 and thus may provide the second visible reference means defining a second transparent plane 49 in combination with the partial mirror 42. The image 24 will optically interact with the background scene 44 to the eye of the viewer 25.

As described hereinabove, the first convex lens 21 and the second convex lens 22 may be tilted to enhance three dimensional information contained in the image 24 or in the background scene 44. In addition, the spacing between the first convex lens 21 and the face plate 16 of the cathode ray tube monitor 14 may be changed to adjust the apparent location of the image 24 with respect to the background scene 44. Similarly, the apparent location of the image 24 with respect to the background scene 44 may be changed by adjusting the location of the second convex lens 22 with respect to the partial mirror 42.

The background scene 44 may be an illuminated transparency, print or article presenting a luminous object for viewing by the viewer 25 through the partial mirror 42. A so-called "black light" type poster will provide a particularly effective background scene 44. Alternatively, the background scene 44 may be generated on the face plate of a further cathode ray tube type monitor interposed through the side wall of the shroud 46 on the opposite side of the partial mirror 42 from the opening 48.

Referring to FIG. 5, yet another embodiment 50 of this invention is shown which is capable of producing two images in free space at spaced locations with respect to each other. The shroud 52 of the embodiment 50 is a large hollow box-like structure having an internal partition 53 dividing it into left hand and right hand portions as shown in FIG. 5. The right hand portion of the embodiment 50 is substantially identical to the embodiment 40 of this invention as shown in FIG. 4 except that the background scene 44 of FIG. 4 is replaced by an opening 54 through the partition 53 of the shroud 52 in the embodiment 50. Thus the reference numerals of FIG. 4 are used to designate corresponding parts in the right hand portion of the embodiment 50 shown in FIG. 5.

The left hand portion of the embodiment 50 shown in FIG. 5 contains a second cathode ray tube monitor 55 on the opposite side of the partition 53 from the first cathode ray tube monitor 14. The face plate 56 of the second cathode ray tube monitor 55 is oriented in the same direction as the face plate 16 of the first cathode ray tube monitor 14. A further optical array comprising a first convex lens 61, second convex lens 62 and mirror 64 is positioned in front of the face plate 56 of the second cathode ray tube monitor 55. The second convex lens 62 is positioned in the opening 54 of the partition 53 and the first convex lens 61 is positioned in front of the face plate 56 of the second cathode ray tube monitor 55. The mirror 64 extends at a 45° angle with respect to both the first convex lens 61 and second convex lens 62 in alignment with the opening 54 in the partition 53 and the opening 48 in the shroud 52. Thus the arrangement of the first convex lens 61, second convex lens 62 and mirror 64 of the embodiment 50 is identical in arrangement and operation to the first convex lens 21, second convex lens 22 and mirror 32 of the embodiment 30 of this invention shown in FIG. 3. A visible reference means 68 corresponding to the visible reference means 28 of FIG. 3 is preferably provided on or in close spaced relation to the surface of the second convex lens 62 facing the viewer 25. Thus the application of appropriate power and signal to the input lines 19 connected to the second cathode ray tube monitor 55 will produce a luminous object 73 on the face plate 56 thereof. An image 74 of such luminous object 73 will appear to the viewer 25 to float in space between the viewer 25 and the second convex lens 62.

As shown in FIG. 5, the spacing between the face plate 56 of the second cathode ray tube monitor 55 and the first convex lens 61 is smaller than the spacing between the face plate 16 of the first cathode ray tube monitor 14 and the convex lens 21. Thus the image 74 will appear in the background of the image 24 and the viewer 25 will perceive a three-dimensional interrelationship between image 24 and image 74. The luminosity of the objects 23 and 73 may be adjusted so that the images 24 and 74 will appear to the viewer 25 to have luminosity comparable to each other. As discussed hereinabove, the various convex lenses 21, 22, 61, 62 may be tilted with respect to each other and to their respective cathode ray tube monitors 14 and 55 to impart further three-dimensional characteristics to the images 24 and 74 and their interrelationship. As indicated by the double-headed arrows 81, 82, 83 and 84, the convex lenses 21, 22, 61 and 62 may be adjusted in their spacing from each other and from their respective cathode ray tube monitors 14 and 55 in order to produce desired changes in the locations of the images 24 and 74 as perceived by the viewer 25. As indicated in FIG. 5, the cathode ray tube monitors 14 and 55 may also be tilted with respect to and moved toward and away from the lenses 21, 22, 61 and 62 associated therewith to adjust the perceived locations of the images 24 and 74.

It is noted that images produced according to the teaching of this invention will be difficult to view in the absence of at least one of the first visible reference means defining a first transparent plane and second visible reference means defining the second transparent plane. The use of both first and second visible reference means is preferred but not absolutely necessary for most viewers. Furthermore, the first and second transparent planes may be provided by a wide variety of visible reference means which may be quite subtle in providing the required effect according to this invention.

Although a luminous object in the form of a cathode ray tube presentation has been specifically shown in the drawing and discussed hereinabove, any luminous object may be used in embodiments of this invention. For example, the object may be a physical article or a transparency or print with proper illumination, or a light image projected on a surface, properly located for viewing in an apparatus according to this invention.

It is believed that those skilled in the art will make obvious modifications to and combinations of the embodiments of this invention as shown in the drawing and described hereinabove without departing from the scope of the following claims.

What is claimed is:

1. Apparatus for producing a viewable, natural and optically interactive image of a luminous object in free space, comprising:

a first convex lens having an f number substantially between 0.5 and 1.5, spaced a first distance from the luminous object;

a second convex lens having an f number substantially between 0.5 and 1.5, spaced from the first convex lens and on the opposite side of the first convex lens from the luminous object, both the first and second convex lenses being on an optical axis;

a hollow, generally elongated shroud having non-reflective internal surfaces surrounding the luminous object, the first convex lens and the second convex lens and having an open viewing end adjacent to the second convex lens; and a visible reference means generally at the open end of the shroud for defining a reference surface with reference to which the optically interactive image of the luminous object is viewed in free space, without scattering the light emerging from the second lens;

whereby the viewable image is produced and viewed in free space, without a screen, and the visible reference means gives a viewer a depth reference so as to enable the viewer mentally to correctly place the image in free space and not against a surface.

2. The apparatus of claim 1, wherein the visible reference means comprises the open end of the shroud surrounding the optically interactive image, defining a transparent plane for reference in viewing the optically interactive image in free space and for avoiding the tendency in the viewer's mind to imagine the image as lying on a surface behind its actual position in free space.

3. The apparatus of claim 2, further including a second visible reference means for defining a second transparent plane extending transversely to the optical axis and positioned adjacent to the second convex lens and toward the open end of the shroud therefrom.

4. The apparatus of claim 3, wherein the open end of the shroud is positioned approximately at the depth from the second lens at which the image is formed.

5. The apparatus of claim 1, wherein the spacing between the visible reference means and the second convex lens is greater than the spacing between the luminous object and the first convex lens.

6. The apparatus of claim 1, wherein both the first and seocnd convex lenses are Fresnel lenses.

7. The apparatus of claim 1, wherein the first convex lens is positioned with its object distance equal to its focal length.

8. The apparatus of claim 1, wherein the first and second convex lenses are both Fresnel lenses, having substantially the same optical characteristics and mounted normally to the optical axis in the same optical sense with respect to the luminous object.

9. The apparatus of claim 1, including a mirror means for providing an angle in the optical axis, so that the projection of the image is accomplished through a folded optical path.

10. The apparatus of claim 9, wherein the mirror means is interposed between the first convex lens and the second convex lens.

11. The apparatus of claim 1, wherein the luminous object is a discrete figure formed on the face of a cathode ray tube.

12. The apparatus of claim 1, further including a partial mirror mounted obliquely within the shroud between the second convex lens and the open end of the shroud, and wherein a second luminous object is provided within the shroud on the opposite side of the partial mirror from the open end of the shroud.

13. The apparatus of claim 1, further including means for enabling tilting of the second convex lens, for tilting the optically interactive image in space.

14. Apparatus according to claim 1 wherein one of said first convex lens and said second convex lens is tilted with respect to said optical axis.

15. Apparatus according to claim 1 wherein both the convex lenses are tilted with respect to said given optical axis.

* * * * *